(12) United States Patent
Janeling et al.

(10) Patent No.: US 6,217,439 B1
(45) Date of Patent: Apr. 17, 2001

(54) CLIMATE CONTROL UNIT

(75) Inventors: Bo Janeling, Eskilstuna; Lars Malmqvist, Torshälla, both of (SE)

(73) Assignee: Volvo Wheel Loaders AB, Eskilstuna (SE)

(*) Notice: Subject to any disclaimer, the term of this patent is extended or adjusted under 35 U.S.C. 154(b) by 0 days.

(21) Appl. No.: 09/166,923

(22) Filed: Oct. 6, 1998

(30) Foreign Application Priority Data

Oct. 6, 1997 (SE) .................................................. 9703631

(51) Int. Cl.$^7$ ....................................................... B60H 1/12
(52) U.S. Cl. ........................... 454/158; 55/467; 55/467.1; 55/471; 454/139; 454/161
(58) Field of Search ..................... 454/158, 159, 454/161, 139; 55/385.2, 385.3, 467, 467.1, 471

(56) References Cited

U.S. PATENT DOCUMENTS

| | | |
|---|---|---|
| 3,657,992 | 4/1972 | Minnick, Jr. . |
| 3,722,182 * | 3/1973 | Gilbertson .............................. 55/467 |
| 4,629,479 * | 12/1986 | Cantoni .................................. 55/471 |
| 5,050,487 * | 9/1991 | Arold et al. .......................... 454/158 |
| 5,119,718 * | 6/1992 | Wagner et al. ....................... 454/158 |
| 5,342,238 | 8/1994 | Segerpalm et al. ............. 454/158 X |
| 6,110,036 * | 8/2000 | Queinnec ............................. 454/139 |

FOREIGN PATENT DOCUMENTS

| | | | |
|---|---|---|---|
| 1 354 277 * | 5/1974 | (GB) | ..................................... 454/158 |
| 1 504 385 | 3/1978 | (GB) | . |
| 2 020 006 | 11/1979 | (GB) | . |
| 56-79010 * | 6/1981 | (JP) | ..................................... 454/139 |
| 56-79011 * | 6/1981 | (JP) | ..................................... 454/139 |

* cited by examiner

*Primary Examiner*—Harold Joyce
(74) *Attorney, Agent, or Firm*—Tracy W. Druce; David P. LeCroy

(57) ABSTRACT

A climate control unit (4) for excavators (2), comprises a fan (6) arranged in a first opening (8) in an operator cab wall (10) of the excavator (2), at least one main filter (24) arranged to cover the first opening (8) and a first cover (26) arranged over the main filter (24) and the first opening (8). The first cover (26) has a first inlet opening (28) in which a prefilter (30) is arranged.

18 Claims, 2 Drawing Sheets

CLIMATE CONTROL UNIT

FIELD OF THE INVENTION

The present invention relates to a vehicle climate control unit comprising a fan arranged in a first opening in an operator cab wall of the vehicle, at least one main filter arranged to cover the first opening, and a first cover arranged over the at least one main filter and the first opening.

BACKGROUND OF THE INVENTION

Excavation vehicles, such as wheel loaders and dumpers often operate in dusty environments containing particles and substances which are harmful if inhaled. In order to prevent the dust from reaching the operator of the vehicle, the operator cab is provided with a dust filter through which ventilation air to the operator cab passes and is thus filtered.

For filtering out fine dust, a filter is required with a high degree of separation, which means that the filter structure will be close. Since the total amount of dust generated by the excavator is often great, the problem of the filter becoming quickly clogged will arise.

Filters used in excavators are therefore dimensioned with large surfaces to extend the time before the filter becomes clogged.

In order to prevent dust from penetrating through leaks into the cab, an overpressure is created therein. However, dust clings to the operator and accompanies him as he enters the cab. The dust which the operator brings with him will circulate inside the cab when the air in the cab is recirculated and cooled by an air conditioning system in the cab therein.

SUMMARY OF THE INVENTION

It is the purpose of the present invention to achieve a climate control unit of the type described by way of introduction which permits the total filter surface to be made smaller while retaining a long service interval between filter replacements.

Another purpose is to achieve a climate control unit where the amount of recirculated air and outside air can be regulated at the same time as both the recirculated air and the outside air are filtered.

An additional purpose is to achieve a service-friendly climate control unit.

Still another purpose is to achieve a climate control unit which permits rapid cooling and simultaneous filtering of the air in the cab.

Still another purpose is to achieve an air purification function to obtain a higher degree of particle separation at the breathing zone of the operator than the rated degree of separation of the filter.

This is achieved with the climate control unit according to the invention by virtue of the fact that the first cover comprises a first inlet opening, in which a prefilter is arranged.

Such a climate control unit allows the total filter surface to be reduced at the same time as the service intervals for replacement or cleaning of the filters are maintained. Inspection and service will be simplified due to the placement of the climate control unit on the outside of the cab.

BRIEF DESCRIPTION OF THE DRAWINGS

The invention will be described in more detail below with reference to examples shown in the accompanying drawings, of which

DETAILED DESCRIPTION OF THE INVENTION

Figure 1:
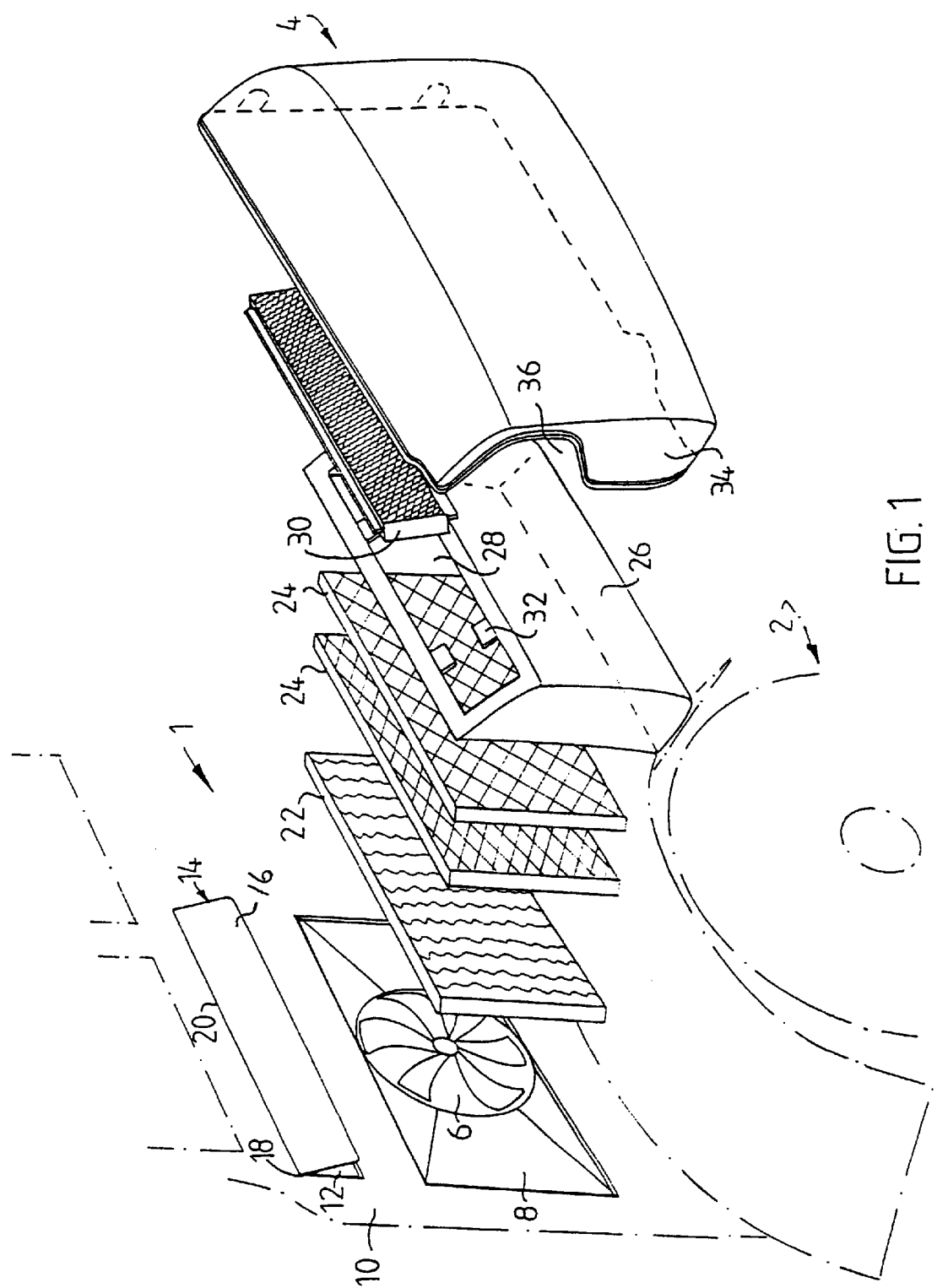
FIG. 1 shows an exploded view of a climate control unit according to the present invention.

In FIG. 1, there is indicated an operator cab 1 on an excavator type vehicle 2 such as a wheel loader or a dumper. The climate control unit 4 according to the invention is shown in FIG. 1 in exploded view. A fan 6 is arranged in a first opening 8 in the wall 10 of the operator cab 1. Above the first opening 8 there is a second opening 12 arranged. In order to control the amount of recirculated air and the amount of outside air a damper 14 in the form of a pivoted flap 16 is hinged 18 at the upper edge 20 of the second opening 12. The functioning of the damper 14 will the described in more detail below.

Heat exchanger 22 which is part of an air conditioner can be placed in the first opening 8 in front of the fan 6. The heat exchanger 22 has a cooling medium flowing in it which cools the air blown into the operator cab 1 with the aid of the fan 6. Alternatively heated medium flows in the heat exchanger 22 thus heating the air blown into the operator cab 1.

One or more main filters 24 cover the first opening 8 so that the air inducted into the operator cab 1 must pass through the main filter 24 and thus be filtered. In the example shown in FIG. 1 two main filters 24 are mounted in front of the first opening 8, having the same or different filter structures. If a heat exchanger 22 is included in the climate control unit 4 it is preferably placed between the fan 6 and the main filter 24 located closest to the fan 6.

A first cover 26 comprising a first inlet opening 28 is mounted over the first and second openings 8 and 12 respectively. The first cover 26 seals against the wall 10 of the operator cab 1 with the aid of a sealing gasket (not shown in FIG. 1) on the first cover. The first cover 26 is preferably mounted with screws or hinges (not shown in FIG. 1) on the wall 10 of the operator cab 1, so that the first cover 26 can be swung upwards, downwards or to the side when the main filters 24, the heat exchanger 22 or the fan 6 is to be inspected or replaced. In the first inlet opening 28 of the first cover 26 a prefilter 30 is intended to be mounted. Prefilter 30 is preferably fixed with snap means 32 on the first cover 26.

Outside air, which is brought into the operator cab with the aid of the fan 6, passes first through the prefilter 30 and thereafter through the main filter 24. The prefilter 30 can have the same structure as the main filter 24 or have a different structure.

A second cover 34 is designed to be mounted on top of the first cover 26. This second cover 34 comprises a second inlet opening 36 for outside air. The second cover 34 seals against the wall 10 of the operator cab 1 with the aid of a gasket (not shown in FIG. 1) on the second cover 34. The second cover 34 is preferably provided with hinges (not shown in FIG. 1) on the wall 10 of the operator cab 1 so that the second cover 34 can be swung upwards, downwards or to the side to provide access to the first cover 26.

Figure 2:
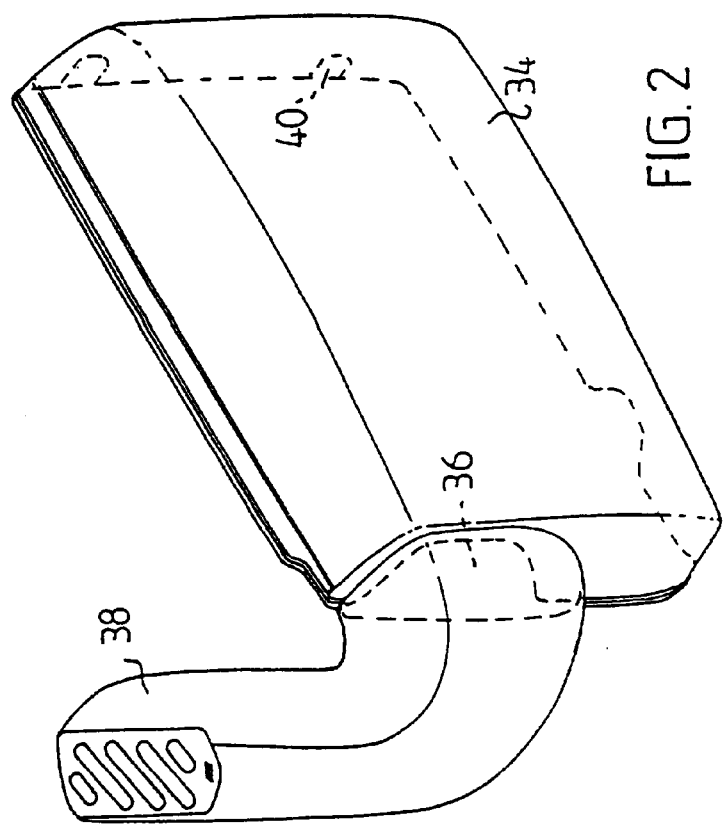
FIG. 2 shows a perspective view of a second cover in accordance with the invention, on which an inlet pipe is mounted.

FIG. 2 shows a perspective view of the second cover 34. An inlet duct 38 for outside air is arranged at the second inlet opening 36. The inlet duct 38 is made to extend to a location behind the operator cab 1. In this location the dust is less thick than at other locations around the excavator 2. In the example shown in FIG. 2 of the second cover 34, the hinges 40 are arranged on the side of the second cover 34 opposite to the side where the second inlet opening 36 is arranged.

Figure 3:
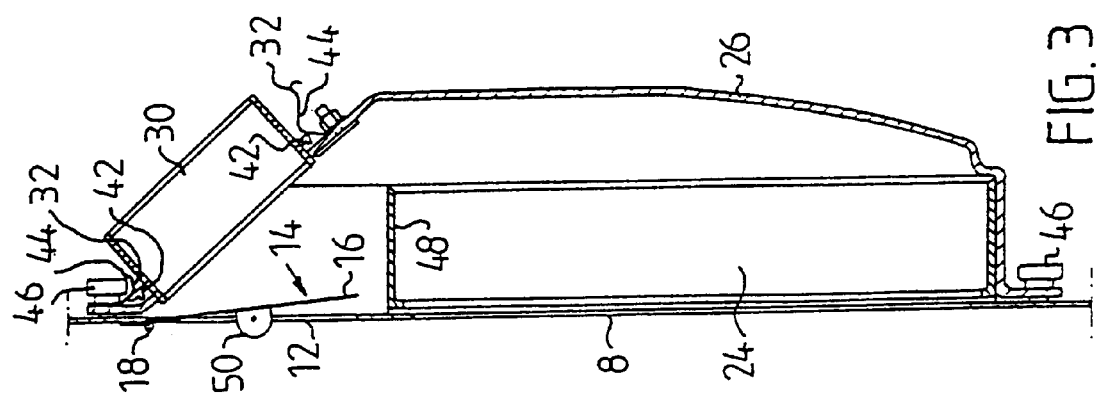
FIG. 3 shows a cross-section of a climate control unit according to the present invention.

FIG. 3 shows a cross-sectional view of the climate control unit 4 according to the invention. The second cover 34 is not shown in FIG. 3. The prefilter 30 is preferably provided with a flange 42 co-operating with clips 44 arranged on the first cover 26. The clips 44 function as snap mean 32. Screws 46 fix the first cover 26 to the outside of the wall 10 of the operator cab 1. FIG. 3 shows a main filter 24 which is inserted into a frame 48. The flap 16 for the damper 14 is provided with an eye 50 designed to co-operate with a rod or the like (not shown in FIG. 3), which is included in an operating device for the damper 14. This operating device can work either manually by the operator or automatically by a control unit. In FIG. 3, both the second opening 12 in the wall 10 of the operator cab 1 and the first inlet opening 28 in the first cover 26 are open. A mixture of recirculated air from the operator cab 1 and outside air will thus pass through the main filter 24 and flow on into the operator cab 1. If the flap 16 is pivoted towards the first inlet opening 28 in the first cover 26 to a first end position, then the first inlet opening 28 will be closed. Preferably, the area of the first inlet opening 28 is greater than the area of the flap 16, so that the flap 16 will not cover the entire first inlet opening 28. However, the flap 16 can be made so that it covers the entire second opening 12. Recirculated air from the operator cab 1 will pass through the main filter 24 and continue flowing into the operator cab 1 at the same time as a small flow of outside air will pass in-between the flap 16 and the gap formed in the first inlet opening 28, to be mixed with the recirculated air. Some outside air will thus always be supplied to the operator cab 1. When the air in the operator cab 1 is recirculated, the previously filtered air is refiltered, thus increasing the degree of particle separation from the air in the operator cab 1 and consequently at the breathing zone of the operator, than what would be indicated by the rated degree of separation of the filter. If the climate control unit 4 is provided with the heat exchanger 22 in which a cold medium flows, in this set position of the flap 16, there will be a rapid and effective cooling and filtering of the air in the operator cab 1. In order to close the second opening 12, the flap 16 is pivoted down towards the second opening 12 to a second end position. Only outside air will then pass through the main filter 24 and flow into the operator cab 1.

What is claimed is:

1. A climate control unit for a vehicle, said climate control unit comprising:
    a main filter arranged to cover a first opening in a wall of an operator cab of a vehicle, said main filter comprising a particle separation filter and said main filter and said first opening being configured so that substantially all air passing into the operator cab from said climate control unit is filtered through said main filter at all times;
    a heat exchanger adapted to regulate temperature of air conveyed into the operator cab through said first opening;
    a fan arranged to provide forced air across said main filter and said heat exchanger and into the operator cab;
    a first cover arranged to cover said main filter, said heat exchanger, said fan, and a second opening in the wall of the operator cab of the vehicle, said second opening being arranged to recirculate air within the operator cab of the vehicle through said main filter;
    said first cover comprises a first inlet opening for accepting outside air and a pre-filter is arranged at said first inlet opening for filtering outside air passing therethrough; and
    a damper arranged to control the amount of outside air flowing in through said first opening.

2. The climate control unit as recited in claim 1, further comprising:
    said main filter comprising at least one particulate filter.

3. The climate control unit as recited in claim 1, further comprising:
    said fan being arranged proximate to said first opening in the cab wall.

4. The climate control unit as recited in claim 1, further comprising:
    said damper arrangement is further arranged to control the amount of recirculation air flowing in through said second opening.

5. The climate control unit as recited in claim 4, further comprising:
    said damper arrangement comprising a pivotable flap arranged to control the amount of air flowing through said first opening and said second opening.

6. The climate control unit as recited in claim 5, further comprising:
    said flap arranged to adopt at least two different positions; a first end position in which said flap covers said second opening in the cab wall thereby preventing recirculation air inflow, and a second end position in which said flap only partially covers said first inlet opening in order to ensure a continuous outside air inflow into the cab.

7. The climate control unit as recited in claim 1, further comprising:
    a second cover arranged at least partially over said first cover and said second cover comprising a second inlet opening.

8. The climate control unit as recited in claim 7, further comprising:
    an inlet pipe connected to said second inlet opening of said second cover.

9. The climate control unit as recited in claim 8, further comprising:
    said inlet pipe being arranged to position an air intake opening behind the operator cab in a location of reduced air dust load.

10. The climate control unit as recited in claim 7, further comprising:
    said second cover being arranged to be at least partially releasable from said cab wall in order to provide access to said first cover.

11. The climate control unit as recited in claim 1, further comprising:
    said climate control unit being adapted to be provided at least substantially on the outside of the cab wall.

12. The climate control unit as recited in claim 1, further comprising:
    said first cover is adapted to be at least partially releasable from said cab wall in order to provide access to said main filter, heat exchanger and fan.

13. The climate control unit as recited in claim 1, further comprising:
    said vehicle is a construction-type vehicle.

14. A climate control unit for a vehicle, said climate control unit comprising:
- a fan adapted to be arranged in a first opening in a wall of an operator cab of a vehicle;
- a main filter arranged to cover said first opening;
- a first cover arranged over said main filter and said first opening, said first cover comprising a first inlet opening in which a prefilter is arranged;
- a second opening adapted to be arranged in the wall of the operator cab of the vehicle, said first cover being disposed over said second opening;
- a damper operatively associated with a pivotable flap, said flap having an area less than an open area of the first inlet opening and said area of said flap being substantially the same as an area of said second opening; and
- said damper being configured so that when said flap is pivoted to a first end position, said first inlet opening is substantially closed by said flap and said second opening is open, and when said flap is pivoted to a second end position, said first inlet opening is open and said second inlet opening is closed; and
- in said first end position, a gap is formed between said first inlet opening and said flap so that outside air is continuously supplied to the operator cab of the vehicle during operation of said climate control unit.

15. A climate control unit for a vehicle, said climate control unit comprising:
- a first cover arranged at a wall of an operator cab of a vehicle and about a fan and a main filter, said first cover establishing a housing having an interior space therein;
- a first inlet opening provided into said interior space of said housing for allowing outside air to be selectively drawn into said interior space by said fan and a second inlet opening provided into said interior space of said housing for allowing air from inside the operator cab of the vehicle to be selectively drawn into said interior space by said fan; and
- a damper configurable into an end position in which said first inlet opening to outside air is substantially closed by a surface area of said damper substantially covering an open area of said first inlet opening, said surface area of said damper being less than said open area of said first inlet opening thereby establishing a gap space between said damper and said first inlet opening in said end position for preventing an absolute closure of said first inlet opening and assuring that outside air is continuously drawn into the operator cab of the vehicle during operation of said climate control unit.

16. The climate control unit as recited in claim 15, further comprising:
- a heat exchanger adapted to regulate temperature of air conveyed into the operator cab through said first inlet opening.

17. The climate control unit as recited in claim 15, further comprising:
- a prefilter arranged to cover a substantial entirety of said open area of said first inlet opening thereby assuring prefiltration of substantially all outside air processed by said climate control unit.

18. The climate control unit as recited in claim 15, further comprising:
- an inlet pipe placed in fluid communication with said first inlet opening and arranged to extend to a position behind the operator cab for intaking outside air having a lower particulate load than outside air located proximate said first inlet opening.

* * * * *